April 15, 1924.
E. M. BOUTON
1,490,197
MOTOR CONTROL SYSTEM
Filed Aug. 17, 1920
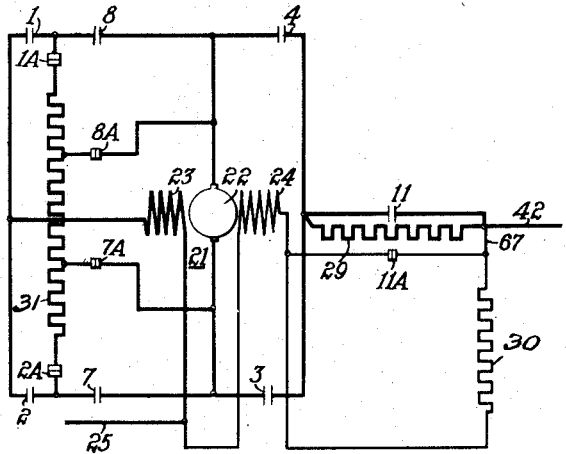
Fig. 1.
Fig. 3.
Sequence of Operation
| Con | L.V. | O.T. | Cut. | BK | Off BK | Ret. | O.T. | L.V. |
|---|---|---|---|---|---|---|---|---|
| 1 | | | | | | ○ | ○ | ○ |
| 2 | ○ | ○ | ○ | | | | | |
| 3 | | | | | | ○ | ○ | ○ |
| 4 | ○ | ○ | ○ | | | | | |
| 11 | | ○ | | | | ○ | | |
| 8 | ○ | ○ | ○ | ○ | ○ | ○ | ○ | |
| 7 | | ○ | ○ | ○ | ○ | ○ | ○ | |
| 1A | ○ | ○ | ○ | ○ | ○ | ○ | | ○ |
| 2A | ○ | | | ○ | ○ | ○ | ○ | ○ |
| 11a | ○ | ○ | | ○ | ○ | ○ | | ○ |
| 8a | ○ | | | | | | ○ | ○ |
| 7a | ○ | ○ | | | | | | ○ |
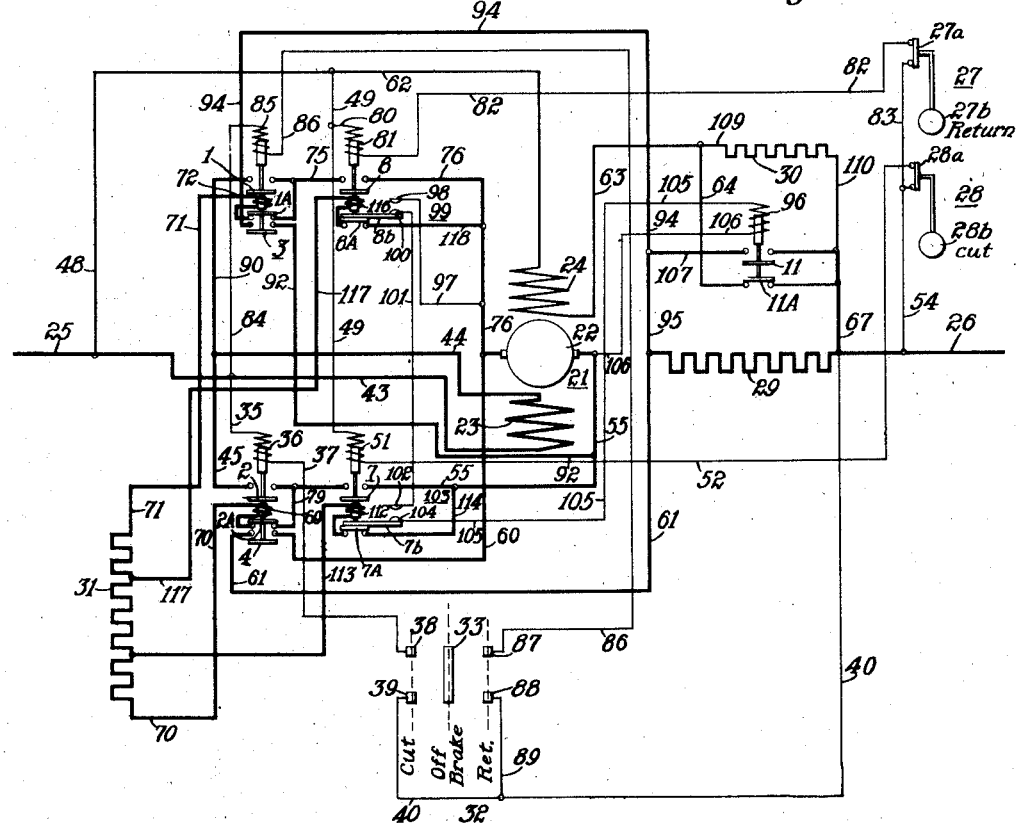
Fig. 2.
WITNESSES:
H. T. Shelhamer
H. C. Lowe
INVENTOR
Edgar M. Bouton
BY
Wesley G. Carr
ATTORNEY Patented Apr. 15, 1924.

1,490,197

UNITED STATES PATENT OFFICE.

EDGAR M. BOUTON, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed August 17, 1920. Serial No. 404,043.

*To all whom it may concern:*

Be it known that I, EDGAR M. BOUTON, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to systems for operating motors which must repeatedly reverse their direction of operation, such, for example, as reversing planer motors.

The principal object of my invention is to provide protective devices to prevent a planer from over-traveling when the motor fails to reverse itself because of its directional contactors failing to function properly.

The second object of my invention is to provide several dynamic-braking circuits for a motor in accordance with the different conditions to which the motor is subjected. It will be apparent to those skilled in the art that less resistance for the dynamic-braking circuit is required when the contactors for a motor open because of low voltage, for example, than in an emergency, such as when the motor over-travels through some failure in the control system.

Heretofore, in some cases, motors have been provided with dynamic braking circuits for each direction of travel thereof. These control circuits have not always properly functioned, as sometimes a motor continued to operate in one direction beyond the point where it should have reversed, and unless some protective means was attached to the motor or a machine driven thereby, injury was liable to result to both.

Briefly speaking, my invention consists in providing additional contactors for opening the armature circuit of a motor, when the motor over-travels, and having other contactors co-operating with them to complete a dynamic-braking circuit for stopping the motor.

A better understanding of my invention may be secured by referring to the accompanying drawings, Fig. 1 of which is a schematic view of a motor-control system designed in accordance with my invention;

Fig. 2 is a diagrammatic view of a control system shown in Fig. 1;

Fig. 3 is a sequence chart showing the order in which the contactors of the control system shown in Figs. 1 and 2 close for the various operations of the motor.

Referring particularly to Figs. 1 and 2, a motor 21 having an armature 22, a series field winding 23 and a shunt field-magnet winding 24, is electrically energized from line conductors 25 and 26. The direction of operation of the motor 21 is controlled by the customary directional contactors 1, 2, 3 and 4. Auxiliary contactors 1A and 2A are mechanically interlocked with contactors 1 and 2, respectively, in accordance with a familiar practice.

Contactors 7 and 8, having auxiliary contactors 7A and 8A respectively secured thereto, are controlled by over-travel limit switches 27 and 28, respectively. A contactor 11 is provided for shunting a starting resistor 29 which is in series with the motor 22. An auxiliary contactor 11A is mechanically connected to the contactor 11 and, when closed, provides a shunt circuit for the shunt field-magnet winding 24 around the field resistor. A dynamic-braking resistor 31 is electrically connected to the contactors 1A, 2A, 7A and 8A.

A master controller 32 controls the direction of operation of the motor 21 by being electrically connected to the actuating coils of the sets of directional contactors 1 and 3, and 2 and 4. The master controller 32 has a central off position and a cut or forward position and a return position on opposite sides of the off position. The off position is also the dynamic-braking position for the motor in both the cut and the return directions.

The operation of the control system is begun by moving a contact segment of the master controller 32 from the off position to either the left or the right thereof, in accordance with the position of the machine which is actuated by the motor. The controller 32 is so actuated by the planer or other machine (not shown) driven by the motor 21 that after the planer has traveled a given distance, the controller 32 is reversed. The controller 32 may, however, be manually operated during the starting of the machine.

When the contact segment 33 is brought to the cut position of the master controller 32, a circuit is established from line conductor 25 through conductor 35, actuating coil 36 of the mechanically connected contactors 2, 2A and 4, conductor 37, contact terminal 38, contact segment 33, contact terminal 39 and conductor 40 to line conductor 26. The completion of this circuit energizes the actuating coil 36 and causes the contactors 2 and 4 to close and contactor 2A to open.

A main circuit now extends from the line conductor 25 through conductor 43, series field-magnet winding 23, conductors 44 and 45 and contactor 2 as far as contactor 7.

The contactor 7 is closed whenever a line switch (not shown) electrically connects the line conductors 25 and 26 to a source of electrical energy. The corresponding auxiliary circuit is established from the line conductor 25 through conductors 48 and 49, actuating coil 51, conductor 52, contact bridge 28$^a$ of the over-travel limit switch 28 and conductor 54 to line conductor 26. The actuating coil 51, being energized, will effect the closing of the contactor 7 and the opening of contactor 7A.

The contactor 7 being closed, the main circuit from contactor 2 is continued through contactor 7 and conductor 55 to the armature 22 of the motor 21 and thence, through conductor 60, contactor 4, conductor 61 and resistor 29, to line conductor 26. The completion of this circuit causes the armature 22 and the series field-magnet winding 23 to be energized, thereby starting the motor 21.

The shunt field-magnet winding 24 has already been energized by a circuit from line conductor 25 through conductors 48 and 62, field-magnet winding 24, conductors 63 and 64, contactor 11A and conductor 67 to line conductor 26. The motor 21 will continue to drive the planer in the cut direction until the planer actuates the contact segment 33 in a reverse direction by a mechanism which is not shown, but which is well-known in the art. As soon as the circuit is broken through the contact terminals 38 and 39 by the contact segment 33 being moved therefrom, the actuating coil 36 is de-energized, whereupon the contactors 2 and 4 return to their normal open position and the contactor 2A is closed.

A dynamic-braking circuit is established through the resistor 31 by the closing of the contactor 2A, as the contactor 1A is normally closed during the "cut" direction of rotation. This circuit is established from the contactor 2A through holding coil 69, conductor 70, dynamic-braking resistor 31, conductor 71, holding coil 72, contactor 1A, conductor 75, contactor 8, which is normally closed when the line conductors 25 and 26 are energized, conductor 76, armature 22, conductor 55, contactor 7 and conductor 79 to contactor 2A. The completion of this dynamic-braking circuit quickly stops the motor and planer, and when the contact segment 33 has been moved by the machine to the return position, the motor reverses its operation, causing the machine to move in the return direction.

The auxiliary circuit which maintains the contact bridge 8 in its closed position when the line conductors 25 and 26 are energized is established from line conductor 25 through conductors 48 and 49, and 80, actuating coil 81 of the contactor 8, conductor 82, contact bridge 27$a$ of the over-travel limit switch 27 and conductors 83 and 54 to line conductor 26.

When the contact segment 33 occupies the return position, an auxiliary circuit is established from line conductor 25 through conductor 84, actuating coil 85 of the contactors 1, 1A and 3, conductor 86, contact finger 87, of the master controller 21, contact segment 33, contact finger 88 and conductors 89 and 40 to line conductor 26. The completion of this circuit energizes the actuating coil 85, thereby closing the mechanically connected contactors 1 and 3 and opening contactor 1A.

When the contactors 1 and 3 are closed, a main circuit is established from the line conductor 25 through conductor 43, series field-magnet winding 23, conductors 44 and 90, contactor 1, conductor 75, contactor 8, conductor 76, armature 22, conductors 55 and 92, contactor 3, conductors 94 and 95 and starting resistor 29 to line conductor 26. The completion of this circuit causes the motor 21 to operate in a reverse direction, for it is apparent that the series field-magnet winding 23 and the shunt field-magnet winding 24 are energized in the same direction and only the current through the armature has been reversed from that employed in operating the motor in the cut direction.

After the motor has driven the machine a predetermined distance in the reverse direction, the contact segment 33 is moved in a forward direction by the same device heretofore mentioned, which is actuated by the planer or machine. The movement of the contact segment 33 breaks the circuit through contact fingers 87 and 88, thereby de-energizing the actuating coil 85 of the contactors 1, 1A and 3, causing the contactors 1 and 3 to open and the contactor 1A to close. Since the contactor 2A is normally closed during the return operation, the closing of the contactor 1A establishes the same dynamic-braking circuit, as has already been described in connection with dynamic braking when the motor is operating in the cut direction.

The contact segment 33 is thus again actuated to the cut position of the controller 32 and the motor 21 is again operated so as to drive the machine in the cut direction. These operations continue as long as is desired by the operator or until something occurs which prevents the proper operation of the directional contactors.

The speed of the motor 21 is accelerated in both the forward and the reverse operation by shunting the starting resistor 29, which is in series with the motor armature 22, and by weakening the energization of the shunt field-magnet winding 24. Both of these operations are performed by energizing an actuating coil 96 of the mechanically connected contactors 11 and 11A, thereby causing the contactor 11 to close and the contactor 11A to open. The circuit for energizing the actuating coil 96 extends from the armature 22 through conductors 76 and 97 to contact terminal 98 of the relay 99, contact terminal 100, (the relay 99 being closed when the contactor 8 is closed) conductor 101, contact terminal 102 of the relay 103, contact terminal 104 (the relay 103 being closed when the contactor 7 is closed), conductor 105, actuating coil 96 and conductor 106 to the armature 22.

It is apparent that this circuit is energized by the counter E. M. F. generated by the armature 22 and, after the motor has reached a certain speed, the coil 96 becomes sufficiently energized to close the contactor 11, thereby establishing a shunt circuit from the conductor 95 at the armature end of the starting resistor 29 through conductor 107, contactor 11 and conductor 67 to line conductor 26.

At the same time that the starting resistor 29 is shunted, the shunt field-magnet winding 24 is weakened by the resistor 30 being placed in series therewith upon the opening of the shunt circuit around the resistor 30 through contactor 11A. The shunt field-magnet winding 24 is then energized from the line conductor 25 through conductors 48 and 62, shunt field-magnet winding 24, conductors 63 and 109, resistor 30 and conductors 110 and 67 to line conductor 26.

If, for any reason, the directional contactors 1, 2, 3 and 4 fail to operate properly, the planer will continue to travel in either a forward or a reverse direction until it strikes an arm of one of the over-travel limit switches 27 or 28.

Assuming that, for some reason, the contactors 2 and 4 fail to open and the machine continues to operate in a cut direction until the planer strikes the arm 28b of the over-travel limit switch 28, the switch 28 will be opened to break the circuit through the actuating coil 51 of the contactor 7. When the actuating coil 51 is de-energized, contactor 7 will open, thereby breaking the circuit through the motor armature 22, and contactor 7A will close, thus establishing a dynamic-braking circuit from the contactor 7A through holding coil 112, conductor 113, a portion of the dynamic braking resistor 31, conductor 71, holding coil 72, contactor 1A, conductor 75, contactor 8, conductor 76, armature 22 and conductors 55 and 114 to contactor 7A. The completion of this dynamic-braking circuit through the larger portion of the resistor 31 will quickly stop the motor 21 and the planer.

Similar protective means is also provided for the motor, when operating in a reverse direction, by the planer striking the arm 27b of the over-travel limit switch 27, should the planer travel too far. When the arm 27b is struck, the contact bridge 27a breaks the circuit through the actuating coil 81 of the mechanically connected contactors 8 and 8A, thereby opening contactor 8 and closing contactor 8A. This establishes a circuit from the contactor 8A through holding coil 116, conductor 117, a portion of dynamic-braking resistor 31, conductor 70, holding coil 69, contactor 2A, conductor 79, contactor 7, conductor 55, armature 22 and conductors 76 and 118 to contactor 8A. This dynamic-braking circuit includes a portion of the resistor substantially equal to that used in applying dynamic braking when the over-travel limit switch 28 is opened by the machine over-traveling in the cut direction.

It may be noted that the contactors 8 and 8A are provided with an arm 8b and that the contactors 7 and 7A are provided with a similar arm 7b. The actuating coil 96 is de-energized when either of these arms is in its lower position, thereby causing the contactor 11 to open and the contactor 11A to close. The purpose of closing the contactor 11A is to shunt the field resistor 30, which is in series with the shunt field-magnet winding 24, and thus provide as strong a field as possible, when effecting dynamic braking of the motor 21 during its overtravel.

A third system of dynamic braking is provided when the contactors 1, 2, 3, 4, 7, 8 and 11 open because of low line voltage. The contactors are then in their respective positions, shown in Figs. 1 and 2. The directional contactors 1, 2, 3 and 4 and the contactors 7 and 8 are opened and the contactors 1A, 2A, 7A, 8A and 11A are closed. A dynamic-braking circuit is established from the armature 22 through conductors 55 and 114, contactor 7A, holding coil 112, conductor 113, a relatively small portion of the dynamic resistor 31, conductor 117, holding coil 116, contactor 8A and conductors 118 and 76 to the armature 22.

By my invention I have provided a control system that insures stopping a motor which is operated in either forward or reverse direction if, for any reason, the ordinary reversing means should prove ineffective. I have also provided four forms of dynamic braking of which one includes an entire resistor for ordinary dynamic braking, the second and the third form utilize smaller portions of the resistor for dynamic braking when the motor fails to reverse, in either direction of operation, and the fourth form employs a still smaller portion of the resistor when the contactors are opened because of low voltage.

While I have shown my invention in its preferred form, it is apparent that modifications in the apparatus and circuits may be made without departing from the spirit thereof. I desire, therefore, to be limited only by the scope of the appended claims.

I claim as my invention:

1. In a motor-control system, the combination with a motor armature, a plurality of reversing contactors therefor, and means operated by said motor for controlling said contactors, of a resistor, means coacting with said reversing contactors for connecting said resistor to said armature during dynamic braking, and means comprising a plurality of additional contactors for opening said armature circuit and completing a dynamic-braking circuit through a portion of said resistor upon failure of said directional contactors to reverse said motor, said additional contactors being selectively operated in accordance with the direction of operation of said motor.

2. In a motor-control system, the combination with a motor having an armature, a plurality of directional contactors therefor, and means controlled by said motor for operating said contactors, of a resistor, means for connecting said resistor to said armature to secure dynamic braking of said motor during normal operation and emergency means for effecting dynamic braking of said motor upon a failure of power, a portion of said emergency means and a portion of said connecting means co-operating to effect dynamic braking of said motor upon the overtravel thereof.

3. In a motor-control system, the combination with a motor having an armature, a plurality of directional contactors therefor, and means controlled by said motor for operating said contactors, of a resistor, means coacting with said directional contactors for effecting dynamic braking through the entire resistor, protective means operated by said motor during its overtravel for effecting dynamic braking through a portion of said resistor, and means for effecting dynamic braking of said motor under low-voltage conditions by employing a still smaller portion of said resistor.

In testimony whereof, I have hereunto subscribed my name this 4th day of August, 1920.

EDGAR M. BOUTON.